United States Patent [19]

Jonsson

[11] 4,230,151
[45] Oct. 28, 1980

[54] PINCH VALVE

[76] Inventor: Ulf R. S. Jonsson, Björkelund, Eggvall, Axvall, Sweden

[21] Appl. No.: 6,235

[22] Filed: Jan. 24, 1979

Related U.S. Application Data

[62] Division of Ser. No. 836,136, Sep. 23, 1977, abandoned.

[51] Int. Cl.³ .............................................. F16K 11/00
[52] U.S. Cl. ................................ 137/595; 137/627.5; 137/863; 137/870; 251/7
[58] Field of Search ............... 137/595, 627.5, 863, 137/870; 251/7, 9

[56] References Cited

U.S. PATENT DOCUMENTS

| | | | |
|---|---|---|---|
| 3,018,793 | 1/1962 | Aagaard | 137/595 |
| 3,498,316 | 3/1970 | Pinder et al. | 137/595 |
| 3,575,161 | 4/1971 | London | 137/595 X |
| 3,635,251 | 1/1972 | Gaines | 251/9 X |
| 3,882,899 | 5/1975 | Ginsberg et al. | 137/627.5 |
| 3,895,649 | 7/1975 | Ellis | 137/595 |
| 4,015,942 | 4/1977 | Coupe | 251/9 X |

Primary Examiner—Gerald A. Michalsky
Attorney, Agent, or Firm—Berman, Aisenberg & Platt

[57] ABSTRACT

A pinch valve for controlling the flow through at least two flexible hoses includes an actuating member by which one hose is pinched against an abutment. This abutment is yieldable against a spring bias and normally keeps the other hose pinched. When said one hose has been pinched, the abutment is moved against the spring bias by the actuating member in order to relieve said other hose.

6 Claims, 6 Drawing Figures

PINCH VALVE

This is a division of application Ser. No. 836,136, filed Sept. 23, 1977 now abandoned.

This invention relates to a valve for controlling the fluid flow through hoses or flexible pipes, preferably a servo-operated valve for this purpose.

More particularly the invention relates to a valve of the type controlling the flow through at least two parallel hoses alternatingly by pinching.

When apparatus systems are set up, e.g. such as are used for many chemical, bacteriological, medical or industrial processes, there is a need for means controlling in a simple and reliable manner the flow of fluids, such as liquid and gas, in various parts of the apparatus system. Often such control must be performed automatically in dependence of signals from sensors or timers. Illustrative of such apparatus systems is that used for chromatography wherein several fluids shall flow into the chromatography column and fluid discharged therefrom shall be distributed to a number of receiving vessels. Another example is an apparatus system with filters which from time to time must be rinsed, e.g. by providing a backflow of rinsing fluid through the filter. However, there are also a great number of other applications wherein an automatic control of fluid flows is desired and wherein one or more valves have to be operated at predetermined times when the apparatus normally is not closely supervised.

Servo-operated valves, which are constructed in a conventional manner with a closure member of any common type, are available for the related purpose. However, these valves are expensive because they are in most cases manufactured with great accuracy of non-corrosive materials. Requirements as to sterile operation usually involves a more expensive construction because the valve mechanism proper in that case must be sterilizable, e.g. by autoclaving, dismounted from the servo-mechanism.

It is also previously known and has been utilized commercially to provide the valve function by means of a common hose clamp which is operated electro-magnetically, pneumatically or hydraulically. In that case, the hose clamp can be normally open or closed in order to be brought to the opposite position when operated.

Each of U.S. Pat. Nos. 3,018,793 of Jan. 30, 1962, 3,575,161 of Apr. 20, 1971, and 3,895,649 of July 22, 1975 relates to pinch valves wherein two hoses are controlled to be opened and closed alternatingly. The servo-device is operating against the bias of one or more pressure springs to open one hose progressively at the same time closing the other hose progressively, which means that there is no distinct actuation of the two hoses. When one hose is being closed, the opening of the other hose may be initiated before said first hose has been completely closed, which under the circumstances cannot be accepted, considering the disadvantage of contamination of the fluids controlled by the valve and passing through one hose and the other, respectively.

It is a primary object of this invention to provide a new and improved valve of the type referred to above wherein the force required for operating the valve is utilized in a novel manner.

It is another object of this invention to provide a new and improved valve of the type referred to above wherein separate fluid flows can be controlled exactly and distinctly.

A further object of this invention is to provide a new and improved valve of the type referred to above which can be servo-operated electrically, pneumatically or hydraulically in a simple manner.

A further object of this invention is to provide a new and improved valve of the type referred to above which can be constructed as a closed compact unit including a minimum of movable parts.

A further object of this invention is to provide a new and improved valve of the type referred to above to which the hoses can be easily attached in order to minimize the risk of losing sterility.

A further object of this invention is to provide a new and improved valve of the type referred to above which is well suited to be used with standard hose material and fittings of the disposable type commonly used in medical care in order to minimize the risk of contamination of the components used in a system which has to operate under sterilized conditions and in direct contact with biological fluids.

A still further object of this invention is to provide a new and improved valve of the type referred to above wherein the heat transfer between a servo-device and the valve mechanism proper is substantially reduced in order to avoid heating of fluids controlled by the valve in case the servo-device operates under raised temperatures for extended periods.

A still further object of this invention is to provide a new and improved valve of the type referred to above wherein the pinch pressure is substantially of the same magnitude on the two hoses controlled in the valve.

Yet another object of this invention is to provide a new and improved servo-valve of the type referred to above wherein the servo-device can be easily separated from the valve proper in order to be removed therefrom if and when it is necessary to wash or sterilize the valve, so as to avoid the servo-device's being seriously affected by the washing or sterilization process.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the valve of this invention for controlling the flow through at least two parallel hoses alternatingly by pinching comprises a movable support, spring means biasing said support, an actuating member for controlling the pinching of the hoses, which is engageable with one of the hoses to pinch said one hose against said support, a pinch element operatively connected with said support to be moved together with the support when displaced after said one hose is pinched against the support, and a stationary second support, said pinch element engaging the other hose under the bias of the spring means, when the actuating member is deactivated, to keep said second hose pinched against said second support, the passage through said second hose being opened by the pinch element's being lifted from said stationary second support.

The accompanying drawings, which are incorporated in and constitute a part of this specification, illustrate embodiments of the invention and, together with the description, serve to explain the principles of the invention.

Figure 1:
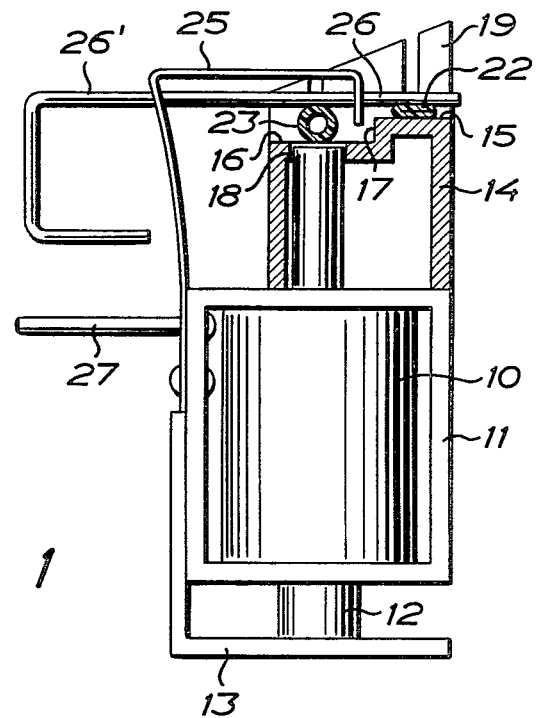
FIG. 1 is a side view, in partial vertical section, of an embodiment of the valve according to the invention, the valve being shown in one of two operative conditions thereof.
Figure 2:
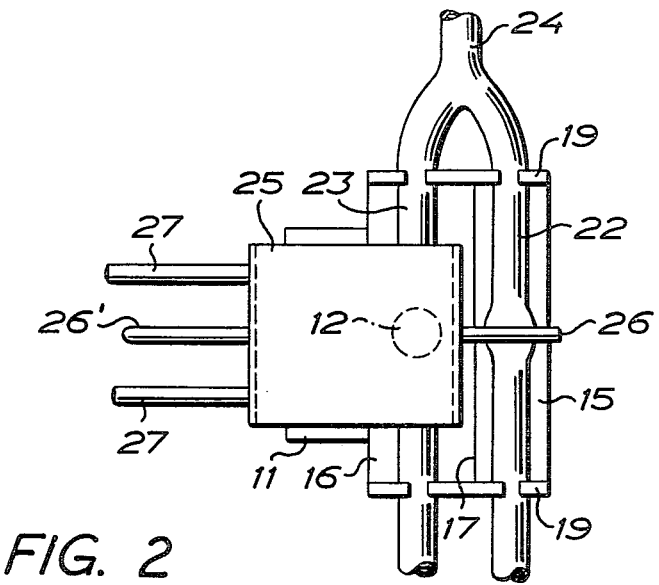
FIG. 2 is a plan view of the valve in the operative condition.
Figure 4:
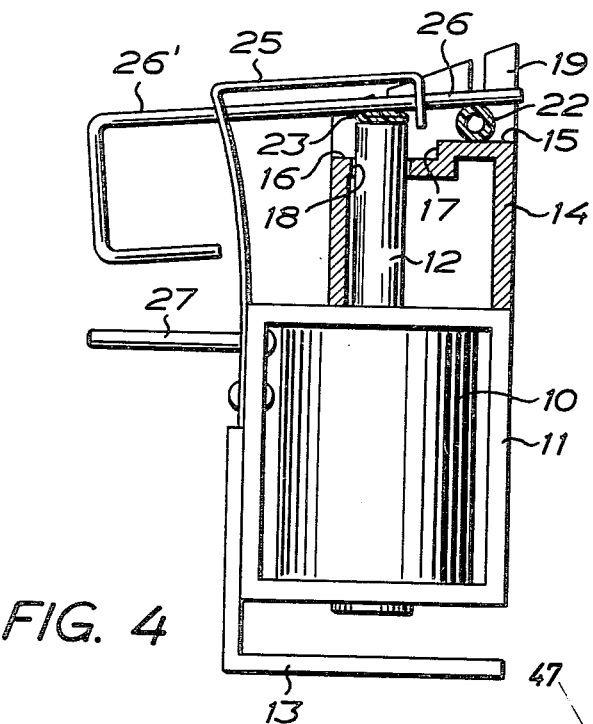
FIG. 4 is a side view, in partial vertical section, similar to FIG. 1, of the valve in the other operative condition thereof.

Reference will now be made in detail to the present preferred embodiments of the invention, examples of which are illustrated in the accompanying drawings.

Referring to FIGS. 1 to 4, the servo-operated valve disclosed therein has a servo-device comprising a solenoid 10 which is mounted in a surrounding frame 11. These two elements can be said to form the body of the valve. Means can be arranged on the frame 11 for mounting the valve in any suitable manner. In the solenoid 10 there is displaceably mounted a cylindrical core 12 of magnetic material, and on the frame 11 there is mounted a bracket 13 which forms an abutment for the core 12 and limits the movement thereof out of the solenoid 10 in one direction, in FIGS. 1 and 4 in the downward direction. A box-like stationary support 14 is mounted to the frame 11, and preferably this support is formed of a plastic material which has good heat insulating properties. The support forms a flat surface 15 at an upper level and a flat surface 16 at a lower level which are separated by a shoulder 17. Core 12 is axially displaceable in through bore 18 which opens at surface 16.

Figure 3:
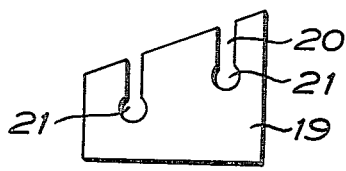
FIG. 3 is a side view of a detail of the valve for mounting the hoses therein.

At each end of the support there is provided an upstanding flange 19 which is shown in more detail in FIG. 3, and in this flange there are provided two mutually separated keyhole slots comprising a narrow portion 20 opening at the edge of the flange and a wide circular portion 21 connecting to the narrow portion. The keyhole slots in one flange are arranged opposite to the keyhole slots of the other flange, the portions 21 in one pair of oppositely disposed slots being at the same level as the surface 15 while the portions 21 of the other pair are at the same level as the surface 16. Two hoses or flexible pipes 22 and 23 of a soft rubber or plastic material such as silicon rubber are inserted into the keyhole slots, preferably of such width that the hoses are retained in correct position by friction, the hoses extending in parallel with each other between the flanges 19 along the surface 15 and the surface 16, respectively, of the support 14 and in the present case converge to a hose or flexible pipe 24 (such branched hose elements as well as single hose elements are available commercially in sterile packages and are well suited for use in the servo-operated valve according to the invention).

A spring blade 25 which is U-shaped having one long leg and one short leg is mounted to the frame 11 at the long leg thereof. Through the legs passes a metal wire 26 which extends substantially in parallel with the web of the spring blade and is circular in cross section. The wire forms a projecting bow 26'. Under the bias of the spring blade 25 the wire 26 is kept pressed against the hose 22 which is thereby pinched between the wire 26 and the flat surface 15 of the support 14, as is shown in FIG. 1. This is a normal or rest condition of the servo-operated valve in which the solenoid is de-energized and in which the passage through the hose 22 is thus interrupted due to the fact that this hose is pinched between the wire 26 and the surface 15. However, the passage through the hose 23 is completely open because the shoulder 17 is of such a height that the wire 26 in this position does not pinch the hose 23 against the surface 16 at all or in any case does not substantially pinch the hose 23.

When the solenoid 10 is energized the core 12 will be drawn into the solenoid, the upper end of the core extending from the opening 18 in the surface 16. Then, the hose 23 is pressed against the spring biased wire 26 which forms a movable support for pinching this hose. When the hose 23 has been pinched and the wire 26 is then lifted against the spring bias provided by the spring 25 the valve will be brought to the operative condition shown in FIG. 4 in which the passage through the hose 23 is closed while the passage through the hose 22 is opened because the free end of the wire 26 has been lifted from the surface 15 whereby the pinching pressure against the hose 22 has been relieved.

If the solenoid 10 is alternatingly de-energized and energized, the passage through one hose can be opened and the passage through the other hose be closed, and vice versa. The servo-operated valve shown and described thus operates as a three-way valve, fluid supplied from the hose 24 being distributed alternatively to the hose 22 and to the hose 23, or fluid being supplied to hose 24 alternatively from the hose 22 and the hose 23.

It is, of course, possible to have one single or two completely independent hoses which are controlled by means of the valve, and by arranging in series several valves of the type described it is possible to distribute the flow nearly in any manner to or from two or more places. The hoses can easily be replaced when so desired by using the holders according to FIG. 3.

As mentioned above, the support 14 is formed of a material having good heat insulating properties and the reason therefor is that the solenoid 10 thereby is heat insulated from the hoses 22 and 23 so that heat developed due to resistance losses in the solenoid 10 when the solenoid is energized for an extended period is prevented from being transferred, by conduction, to the hoses and the fluid contained therein. Under certain circumstances heating of this fluid even to a minor extent cannot be accepted.

If the body of the valve is provided with two projecting screws or pins 27 the pinch element formed by the metal wire 26 and the spring blade 25 can be used for manual operation of the valve by the valve being grasped between the bow 26' and the screws or pins 27 to lift the wire from the surface 15 when the hoses are located on surfaces 15 and 16. By abutting the spring blade the bow 26' prevents the spring blade from being overloaded during such operation.

It is also conceivable to have a pinch member which is pivotably mounted and is actuated by a helical pressure spring or tension spring. Also, the pinch member can be formed by one leg of a helical spring, e.g. of the type used in clothes pins.

Figure 5:
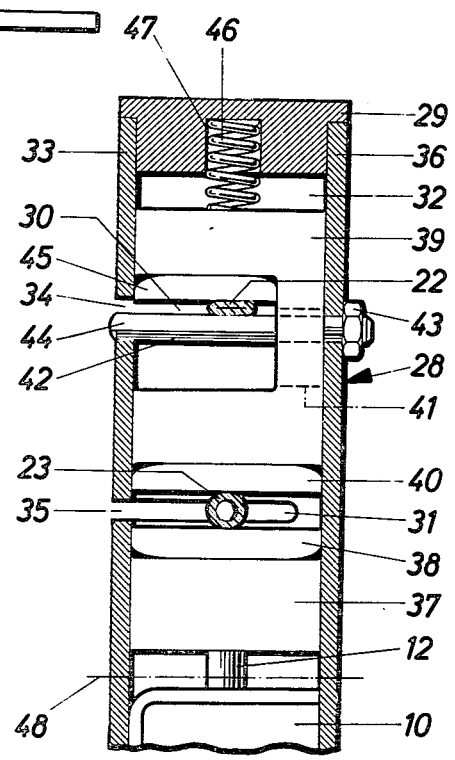
FIG. 5 is a side view, in partial vertical section, of a second embodiment of the valve according to the invention.

According to FIG. 5, the body of the valve is formed by a plastic or metal tube 28 of rectangular, preferably square, or any other cross sectional form which is closed at one end by an end wall 29 fixedly attached to the tube. The solenoid 10 having the core 12 is fitted to the other end of the tube. In the tube there are formed two slots, an upper one 30 and a lower one 31, in each of two opposite side walls of the tube, one of which is shown at 32, the slots in one wall being opposite to those in the other wall. They extend from one of the other two opposite side walls, designated 33, where the slots in each pair are interconnected by a slot 34 and 35, respectively, perpendicular thereto, and end at a point spaced from the other one 36 of said other two opposite side walls. Thus, it will be seen that the hoses 22 and 23, respectively, can be inserted into said slots in the transverse direction of the hoses and that it is not necessary to pass the hoses in the longitudinal direction thereof through the tube 28.

In the tube 28 there is an engagement member 37 which preferably is formed of plastic material and is guided for longitudinal movement in the tube, and this engagement member may be connected to the upper end of the core 12 in any suitable way. It forms a ridge 38 which extends in parallel with the side wall 32 centrally of the engagement member.

Another engagment member 39, which may also be of plastic material and is guided for longitudinal movement in the tube 28, forms a ridge 40 on the lower side thereof, which extends in parallel with the ridge 38 and is opposite thereto. The member 39 is U-formed, and in the web thereof there is a through opening 41, elongated in the longitudinal direction of the tube, which receives a pin 42 fitted to the wall 36 by a nut 43 which is screwed onto a reduced threaded end portion of the pin. The pin extends in parallel with the wall 32 and forms a longitudinal ridge 44 on the upper side thereof. On the lower side of the upper limb of the member 39 there is formed a ridge 45 which extends in parallel with the ridge 44 and is opposite thereto. The engagement member 39 is biased by a helical pressure spring 46 which is received by a bottom hole 47 in the lower side of the end wall 29 and engages the upper surface of the member 39.

As will be seen, the hoses 22 and 23 received by the slot 30 and the slot 31, respectively, and by the corresponding slots in the wall opposite to the wall 32, are located between the ridges 44 and 45 and between the ridges 38 and 40, respectively. When the solenoid 10 is de-energized which is the condition shown in FIG. 5, the engagement member 39 is biased by the spring 46 to keep the hose 22 pinched between the ridges 44 and 45 which means that the passage through the hose 22 is closed. At the same time the ridges 38 and 40 are kept spaced from each other so that the passage through the hose 23 located therebetween is kept open.

When the solenoid 10 is energized the engagement member 37 will be moved towards the engagement member 39 so that the hose 23 will be pinched between the ridges 38 and 40, which means that the passage through said hose will be closed off. Then, the solenoid will continue to move upwards, lifting the engagement member 39, so that the hose 22 will be relieved when the ridges 44 and 45 are being spaced due to the upward movement of the member 39 in relation to the stationary pin 40 against the bias of the spring 46. As will be seen, the operation of the valve according to this embodiment of the invention basically is the same as that described with reference to FIGS. 1 to 4.

When the solenoid 10 is kept energized for extended periods, heat will be developed in the solenoid due to resistance losses therein. This heat might be transferred to the fluids contained in the hoses due to heat conduction through the body such as the tube 28 in the embodiment of FIG. 5. In many cases heating of the fluids cannot be accepted because the process partially controlled by the valve could be disturbed thereby. In order to avoid or at least substantially reduce heat transfer from the solenoid to the hoses the tube 28 may be cut off along the dot and dash line indicated at 48 in FIG. 5 and the two portions of the tube thus obtained may be connected to each other by a heat insulating connecting piece spacing the adjacent ends of the tube portions. If the portion of the tube 28, to which the solenoid 10 is mounted, is attached to the connection piece by means allowing said portion to be easily disconnected therefrom this provides the advantage that the solenoid portion can be dismounted from the rest of the valve so that the valve mechanism proper can be washed or sterilized as is necessary. The solenoid portion otherwise could be seriously affected by such washing or sterilization due to the penetration of liquid or steam into the winding.

Figure 6:
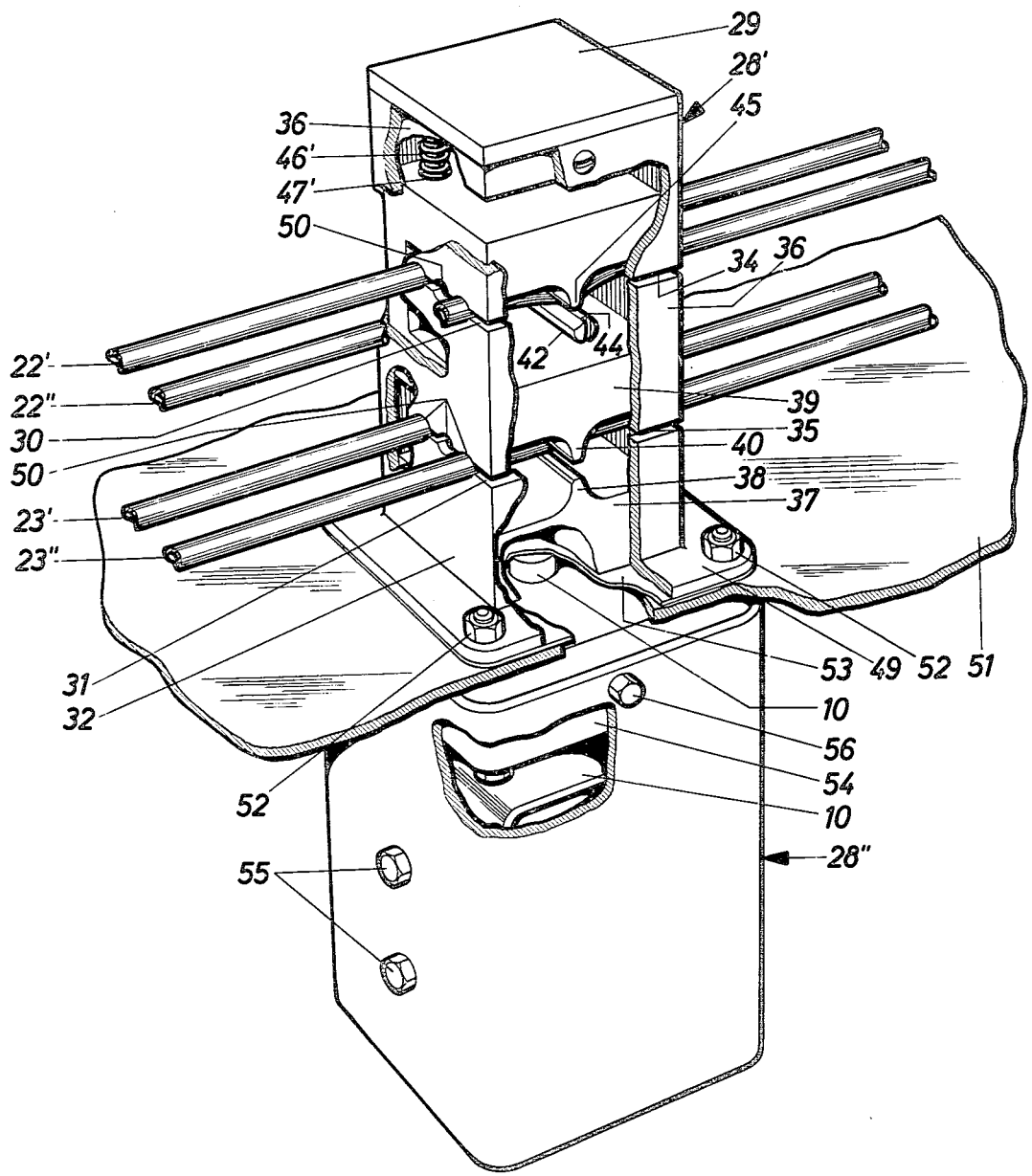
FIG. 6 is a perspective view with parts broken away of a third embodiment of the valve according to the invention.

An embodiment wherein the valve comprises two separable portions, a valve portion and a solenoid portion, is shown in FIG. 6.

In FIG. 6 the valve portion is constructed substantially as shown in FIG. 5 and comprises a tube 28' closed by the end wall 29 at one end and having a circumferential outwardly projecting flange 49 at the other end. The engagement members 37 and 39 are constructed as described with reference to FIG. 5 and the same references have been used for the different portions thereof as in FIG. 5. The centrally located spring 46 of FIG. 5 has been replaced by two or more springs, one spring being shown at 46', which are located close to the wall 36 and are received in a bottom hole 47' in the member 39 while the other end rests against the lower side of the end wall 29 and can be received in a guiding recess therein (not shown).

FIG. 6 also discloses a modified form of the slots 30 and 31. These slots form three enlargements 50 one of which is located centrally of the wall and the other two are equally spaced on both sides of the central enlargement. When two hoses 22' and 22" and 23' and 23" are used in the valve, as shown, they are located in the two side enlargements, and when a single hose 22 and 23 is used as in FIG. 5 it is located in the central enlargement. Thus, the work load from the engagement members will always be applied symmetrically if one, two or three hoses are used in each slot. The risk of asymmetric load can be further minimized by accurate slide fit of the engagement members 37 and 39 in the tube 28', by carefully heat insulating the valve portion from the solenoid, thus avoiding differential heat expansion of the plastic and metal parts, and by using a biasing spring located centrally of member 39 as in FIG. 5.

The tube 28' is secured to a metal sheet 51 at one side thereof by means of screw fasteners 52 an elastic diaphragm 53 such as a rubber diaphragm or similar element being clamped between the flange 49 and the metal sheet 51. A block 54 of plastic material or other material having good heat insulating properties is connected to the lower side of the metal sheet 51 by means of the screw fasteners 52.

The solenoid portion comprises a tube 28" of similar form as the tube 28' and the solenoid 10 is mounted in this tube by screws 55. However, as will be seen, the tube 28" is of larger cross sectional area than the tube 28' which may be preferred in order to allow a big and powerful solenoid to be used. Now, the tube 28" is detachably mounted to the block 54 by means of screws 56 or other quick fasteners. It is noted that the tube 28" has the upper edge thereof spaced from the lower side of the metal sheet 51 in order to avoid or at least substantially reduce the heat transfer by heat conduction from the tube 28" to the metal sheet 51 and thus to the tube 28' and from that tube to the fluid contained in the hoses. The core 12 of the solenoid passes through a bore extending through the block and the metal sheet, the diaphragm 53 being located between the upper end of the core 12 and the lower side of the engagement member 37.

The metal sheet 51 may form part of a box or other structure which must be washed or sterilized from time to time with the valves mounted thereto. Since the solenoids of the valves could be seriously affected by liquid or vapor used for the washing or the sterilization the solenoid portion can easily be removed from the block 54 before the washing or sterilization is to be performed, and can easily be replaced on the block after the washing or the sterilization.

The embodiments described with reference to FIGS. 5 and 6 presently are considered to be the best mode of carrying out the invention. However, modifications may be made, and thus the solenoid may be replaced by a pneumatic or hydraulic servo-cylinder, the core 12 being replaced by a plunger or a piston rod of such cylinder. A small pressure fluid drive of the membrane type is equivalent to a cylinder with a plunger or a piston, and it is also possible to provide a manually operated actuating member for the valve. It may constitute a preferred embodiment of the servo-operated as well as the manually operated valve to provide means for adjusting the bias of the spring 46 from an optimal maximum value down to zero said latter value corresponding to a condition in which the passages are open through the hose or hoses in both slots 30 and 31.

It is possible to adjust the power of the solenoid 10 by suitable control means in such a way that the force exerted by the core 12 is just sufficient to pinch the normally open hose, e.g. hose 23 in FIG. 1 and FIG. 5, but not sufficient to move the wire 26 and the engagement member 39, respectively, in order to relieve the pressure on the other hose 22. This means that the valve when the power of the solenoid is adjusted in this manner can be maintained in a condition wherein both hoses or all hoses in case of more than two are kept pinched so that the respective passages are closed.

I claim:

1. A valve for controlling the flow of fluids through at least two conduits, comprising:
   (a) support means, including a base, for retaining said conduits in substantially parallel relationship, but at different distances from said base;
   (b) said support means including substantially parallel surfaces for supporting said conduits at said different distances from said base;
   (c) a wire which, in its normal position, pinches closed a first of said conduits against a first one of said surfaces, while retaining a second of said conduits, supported by a second one of said surfaces, in an open condition;
   (d) U-shaped leaf spring biasing means for urging said wire, to remain in its normal position, said wire passing through at least one leg thereof; and
   (e) actuating means for displacing said wire against the force of said spring biasing means, from its normal position to a second position, so as to pinch closed said second conduit between said wire and a portion of said second surface and subsequently open said first conduit.

2. The valve set forth in claim 1 wherein said actuating means comprises a solenoid having a core movable in a direction perpendicular to said base in response to the application of electrical energy to said solenoid.

3. The valve set forth in claim 2 wherein said core comprises a lower surface normally abutting said base and an upper surface forming said portion of said second surface.

4. The valve set forth in claim 1 wherein said wire comprises a portion extending beyond said at least one leg for manually displacing said wire from said normal position to said second position.

5. A valve for controlling the flow of fluids through at least two conduits, comprising:
   (a) support means for retaining said conduits in substantially parallel relationship, in proximity to each other;
   (b) stationary abutment means for supporting a first one of said conduits;
   (c) a movable element displaceable transversely of said conduits between a first position below said stationary abutment means and out of engagement with a second one of said conduits and a second position above said stationary abutment means and into engagement with said second one of said conduits;
   (d) pinching means extending across said conduits, which in its normal position pinches closed the first one of said conduits against said stationary abutment means, while leaving the second one of said conduits in an open condition;
   (e) spring biasing means for urging said pinching means to remain in its said normal position; and
   (f) actuating means for displacing said movable element toward and into engagement with said second conduit so as to pinch closed and displace said second conduit between said pinching means and said movable element and to subsequently displace the pinching means away from its said normal position and away from said stationary abutment means, against the force of said spring biasing means so as to open said first conduit.

6. The valve set forth in claim 5 wherein said pinching means comprises a wire.

* * * * *